Figure 1:
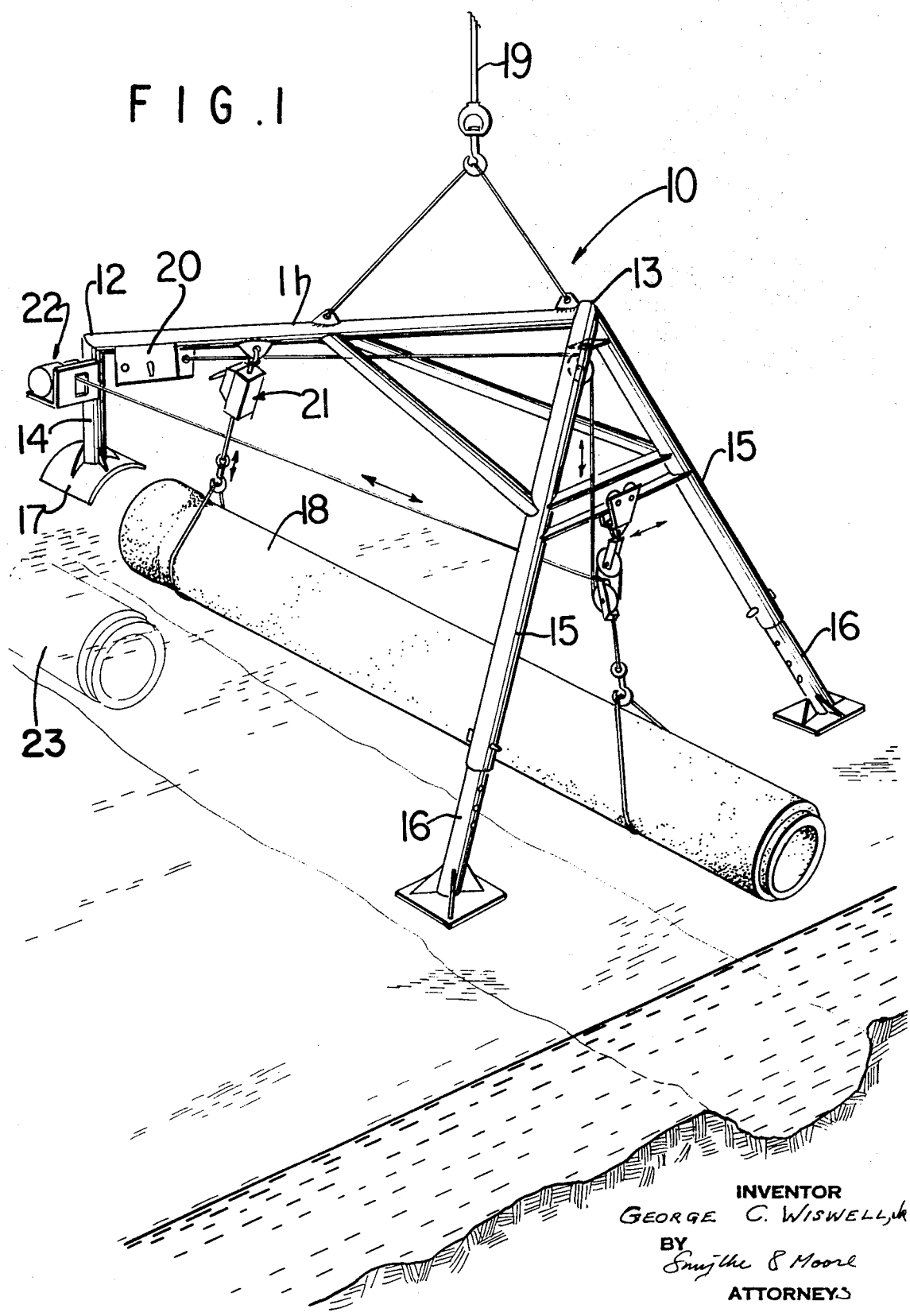

United States Patent
Wiswell, Jr.

[15] 3,657,786
[45] Apr. 25, 1972

[54] LAYING OF SUBAQUEOUS PIPE
[72] Inventor: George C. Wiswell, Jr., 1014 Pequot Road, Southport, Conn. 06490
[22] Filed: Mar. 11, 1970
[21] Appl. No.: 18,478

[52] U.S. Cl. ..........................29/200 P, 29/237, 214/1 PL, 254/143, 61/72.3
[51] Int. Cl. .....................B23p 19/00, B23p 19/04
[58] Field of Search...............................254/143; 212/133-135, 75; 29/234, 429, 200 P, 237; 214/1 PA, 1 PL; 61/72.1, 72.3, 41 A

[56] References Cited

UNITED STATES PATENTS

| 3,204,417 | 9/1965 | Robley | 61/72.3 |
| 3,267,682 | 8/1966 | Robley | 61/72.3 |
| 3,520,514 | 7/1970 | Evans | 254/143 X |
| 3,529,731 | 9/1970 | Penny | 214/1 PA |

*Primary Examiner*—Evon C. Blunk
*Assistant Examiner*—Merle F. Maffei
*Attorney*—Smythe & Moore

[57] ABSTRACT

An elongated member has a short depending leg at one end and a pair of longer legs diverging from the other end. The pipe to be laid is suspended from the elongated member between the diverging legs. Adjusting structure is disposed on the frame to move the suspended pipe axially. Also, the structure will individually adjust vertically the ends of the pipe when the frame has been lowered to rest upon the bottom of the body of water where the pipe is to be laid.

2 Claims, 2 Drawing Figures

PATENTED APR 25 1972

3,657,786

SHEET 1 OF 2

INVENTOR
GEORGE C. WISWELL, Jr.
BY
Smythe & Moore
ATTORNEYS

LAYING OF SUBAQUEOUS PIPE One of the problems encountered when laying pipe under water, particularly large pipe, is to position and join accurately sections thereof. The magnitude and difficulty of this problem is particularly apparent when laying large diameter reinforced concrete pipe wherein a section of the pipe may weight to about 7–10 tons each. Further, the heavy sections must be accurately laid at a depth, for example, of 50 feet on an uneven sea bed. When a section of pipe is to be laid under water, either on the sea bed or in a pre-dug trench, the pipe is slung from a crane mounted on a barge and must be manipulated into final position by a diver. This arrangement is adequate under ideal weather conditions. However, any slight movement of the barge causes the crane boom to oscillate which in turn causes the pipe to move considerably. Such movement of the pipe not only increases the difficulty of accurately positioning and joining of the pipe but also endangers the diver.

One of the objects of the present invention is to provide an improved apparatus for the laying of pipe under water.

Another of the objects of the present invention is to provide an apparatus for the underwater laying of pipe which facilitates positioning and joining of the pipe under water with respect to a previously laid pipe section.

According to one aspect of the present invention, an apparatus for the laying of pipe under water may comprise a frame having a first leg at one end and a pair of diverging legs at the other end thereof. The frame may comprise a single elongated member, and the first leg may be shorter than the legs of the pair. Means are provided for suspending a section of pipe from the frame between the pair of legs. Conveniently positioned on the frame for actuation by the operator are means for moving the suspended pipe axially and means for selectively adjusting vertically the ends of the pipe. The pair of legs may be V-shaped so as to straddle the pipe suspended therebetween, and the shorter leg may be provided with means for resting upon a pipe which has already been laid.

Other objects, advantages and features of the present invention will become apparent from the accompanying description and drawings, which are merely exemplary.

Figure 2:
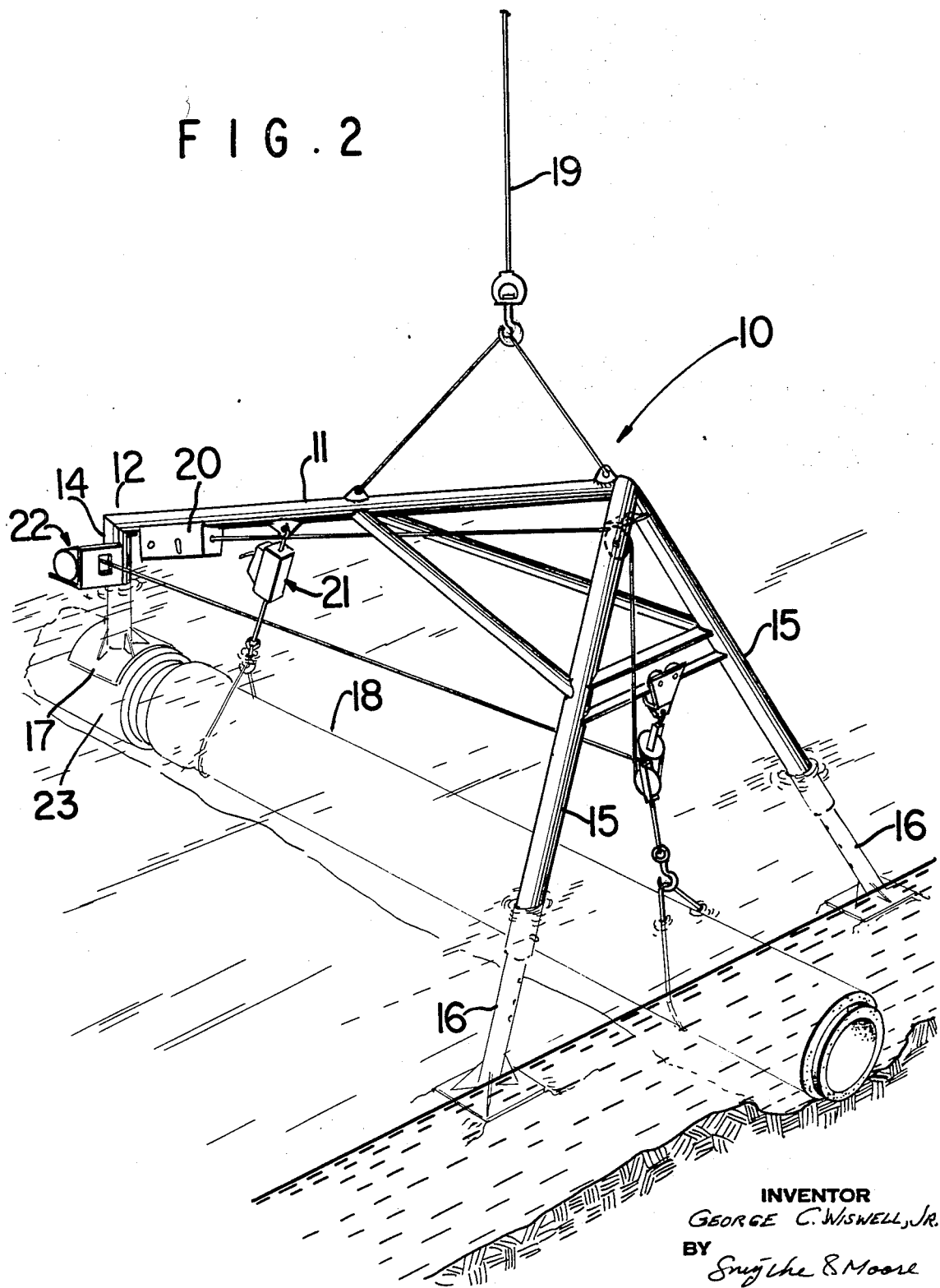

In the drawings:

FIG. 1 is an overall perspective view of the apparatus according to the present invention with a pipe section suspended therebeneath; and FIG. 2 is a perspective view similar to that of FIG. 1 but showing the apparatus positioned on the sea bed with respect to a pipe section that has been previously laid.

Proceeding next to the drawings wherein like reference symbols indicate the same parts throughout the various views, a specific embodiment of the present invention will be described in detail.

As may be seen in the drawings, the apparatus according to the present invention is indicated generally at 10 and comprises an elongated frame member 11 having ends 12 and 13. A leg 14 extends from the frame end 12, and a pair of legs 15 diverge downwardly from the frame end 13 to form a V.

The legs 15 are considerably longer than the leg 14 and form with the shorter leg 14 a tripod-like frame for suspending a pipe section. Each of the legs 15 is provided with a telescoping end extension 16 which can be adjustably positioned within a leg varying the length of the legs 15. The adjustability of the legs 15 is particularly advantageous when the sea bed is uneven and also compensates for the depth of the trench in which a pipe is to be laid.

Leg 14 is provided with a curved plate 17 which functions as a positioning guide and rests near the end of a previously laid pipe section as can be seen in FIG. 2.

A pipe section indicated at 18 is suspended from the frame 11 which in turn is slung from a crane by a cable 19.

Upon the frame 11 and adjacent the leg 14, there are positioned controls which can be actuated by a diver. These controls comprise cables and other related winches which are adjusted and manipulated to move the pipe as desired in order to accurately engage the bell and spigot ends or other forms and to insure proper levelling of the pipe. The controls comprise a control unit 20 which adjusts the height of the outer end of the pipe section 18.

A control unit 21 controls the vertical height of the inner or mating end of the suspended pipe section. A control unit 22 controls the longitudinal or axial positioning of the pipe toward or away from the mating position with regard to the previously laid pipe indicated at 23.

When the pipe section 18 is to be lowered and connected to the previously laid pipe section, the entire frame assembly 10 is lowered onto the sea bed into a position as shown in FIG. 2. The positioning plate 17 on the shorter leg 14 is positioned on the previously laid pipe section 23. The diver positions himself in the vicinity of the shorter leg 14 so that he is in a position to observe the alignment of the inner or mating end of pipe section 18 with the previously laid pipe. By adjusting and manipulating the proper control units as described above, the diver progressively moves the pipe section 18 into the correct position.

During positioning of the pipe section 18, frame assembly 10 is supported on the ocean floor independent of the platform supporting the crane and is not affected by rough water conditions or current. The pipe section can be laid without any direct connection to the surface of the water because during this period, the cable 19 from the crane is slack, and any movement of the crane caused by the sea conditions is not transferred to the underwater assembly 10. This frame assembly thus permits extremely accurate alignment of the pipe, and properly sealed joints can be made consistently. While the apparatus is particularly effective under water, it can also be used in handling heavy pipes on land, such as might be used in the construction of aqueducts, sewage lines and the like.

Thus, it can be seen that the present invention has disclosed a simple but effective apparatus for the underwater laying of pipe. This apparatus allows the laying of pipe to be carried out under conditions which would otherwise be impractical and enables the pipe sections to be accurately and precisely laid in a minimum of time.

It will be understood that various details of construction and arrangement of parts may be changed without departing from the spirit of the invention except as defined in the appended claims.

What is claimed is:

1. An apparatus for the laying of a plurality of end to end and connectable pipe sections underwater comprising an elongated frame member having a first generally vertical leg at one end and a pair of individually adjustable ground engaging legs diverging from said elongated member at the other end thereof together forming an inverted V, said first leg being of fixed length and shorter than said pair of legs, cable means for suspending a section of pipe from said frame between said pair of legs, winch means on said frame for moving said suspended pipe section axially, winch means on said frame for selectively adjusting vertically each end of the suspended pipe section, and an arcuate positioning guide at the end of said first leg resting upon the annulus of a previously laid pipe section, providing the sole support for said frame member at said one end, the supporting of the frame member by said legs permitting said suspended section to be axially aligned with and connectable to said previously laid pipe section.

2. An apparatus as claimed in claim 1 wherein said winch means is controlled by means disposed on said frame adjacent said first leg.

* * * * *